United States Patent [19]

Schatz

[11] Patent Number: 5,184,462
[45] Date of Patent: Feb. 9, 1993

[54] METHOD AND AN APPARATUS FOR THE TREATMENT OF EXHAUST GAS FROM AN IC ENGINE

[76] Inventor: Oskar Schatz, Waldpromenade 16, DW-8035 Gauting, Fed. Rep. of Germany

[21] Appl. No.: 671,501

[22] Filed: Mar. 19, 1991

[51] Int. Cl.⁵ .............................................. B01D 53/34
[52] U.S. Cl. ..................................... 60/274; 60/298; 60/311; 60/320; 60/297
[58] Field of Search ................ 60/310, 274, 297, 311, 60/298, 279, 309, 320

[56] References Cited

U.S. PATENT DOCUMENTS

| | | | |
|---|---|---|---|
| 3,656,303 | 4/1972 | La Force | 60/273 |
| 3,699,683 | 10/1972 | Tourtellote et al. | 60/274 |
| 3,757,521 | 9/1973 | Tourtellotte et al. | 60/274 |
| 3,786,635 | 1/1974 | Kates et al. | 60/278 |
| 3,853,985 | 12/1974 | Winter | 423/210 |
| 4,485,621 | 12/1984 | Wong et al. | 60/274 |
| 4,985,210 | 1/1991 | Minami | 60/274 |
| 5,051,244 | 9/1991 | Dunne et al. | 60/274 |
| 5,078,979 | 1/1992 | Dunne | 60/274 |

FOREIGN PATENT DOCUMENTS

| | | | |
|---|---|---|---|
| 2214772 | 9/1973 | Fed. Rep. of Germany | 60/297 |
| 2189309 | 8/1987 | Japan | 60/297 |
| 0068713 | 3/1988 | Japan | 60/297 |
| 0257710 | 10/1989 | Japan | 60/297 |

Primary Examiner—Ira S. Lazarus
Assistant Examiner—L. Heyman
Attorney, Agent, or Firm—Harness, Dickey & Pierce

[57] ABSTRACT

More particularly for the catalytic treatment of the exhaust gas of an IC engine, such as the IC engine of a motor vehicle, in the case of which the gases of combustion flow through a converter, the latter is provided with an emission buffer designed for the cold start state. It is capable of storing noxious emissions, more particularly those produced during a cold start, such as unburned hydrocarbons and to release them into the exhaust gas again.

28 Claims, 3 Drawing Sheets

METHOD AND AN APPARATUS FOR THE TREATMENT OF EXHAUST GAS FROM AN IC ENGINE

BACKGROUND OF THE INVENTION

The invention relates to a method for the treatment, and more particularly the catalytic treatment, of the exhaust gas of IC engines and more especially of motor vehicle engines, in the case of which the gases resulting from combustion are caused to flow through a converter, and also to an apparatus for performing the method.

When an IC engine is started from cold large quantities of pollutants are emitted in the exhaust gas. It is known to employ a converter, which is placed downstream from the exhaust gas outlet of the engine, in order to reduce the emission of pollutants, the most well known types of converter being those utilized in the case of gasoline engines and referred to as catalytic converters. In the case of diesel engines as well converters are employed in order for instance to reduce the level of CO, unburnt hydrocarbons, and/or soot or solid particles in the exhaust gas. The present invention is more particularly described in relation to converters for gasoline engines, but however the same sort of problems occurs in the case of other converters for the treatment of exhaust gas of IC engines generally.

Such converters demand a certain minimum temperature of the reaction partners in order to develop their effect. Until the reactants have reached this minimum temperature the pollutants are left off into the environment unconverted.

Conventional three-way catalytic converters comprise catalytic material for the oxidation of CO and unburned hydrocarbons, and furthermore for instance for the reduction of $NO_x$. Owing to the time taken for the catalytic converter to reach its operational temperature certain pollutants, and more particularly CO and unburned hydrocarbons will be emitted, while substantial emission of $NO_x$ only occurs when the conventional operational temperatures are attained.

In order to diminish this delay or lag in the coming into operation of the catalytic converter a large number of at least theoretical possibilities have been evolved, as for instance the electrical heating of the exhaust gas before the same reaches the catalytic converter, the additional heating of the catalytic converter or the keeping of the catalytic converter in the heated condition by thermal insulation.

Although some of these measures have led to substantial improvements in the situation, there is still the basic defect that when starting up from cold and in the first three minutes of warming up the engine produces very high emission peak values as regards unburned hydrocarbons and carbon monoxide, while during this time the catalytic converter is still not able to act. The two conditions are connected with the fact that both in the engine and also in the converter the optimum operational temperatures have not yet been reached.

SHORT SUMMARY OF THE PRESENT INVENTION

Accordingly, one object of the invention is to provide a method and an apparatus such that the exhaust gas flow only has a high concentration of unburned hydrocarbons and carbon monoxide when the converter has reached a sufficiently high operational temperature and thus has attained an ample degree of conversion.

In order to achieve these and/or other purposes, in the present invention at least in the operational conditions with an insufficient rate of conversion of the converter the exhaust gas is passed between the outlet of the engine and the inlet of the converter via an emission buffer, which is adapted to store noxious emissions from the engine in a first condition and in a second condition to release them again, and the emission buffer is adapted to be changed over from the first condition to the second condition as soon as the converter has achieved a sufficiently high conversion rate, the emissions preferably being stored in the emission buffer in a suitable storage material.

In accordance with a further possible development of the invention a storage material is utilized, whose first condition is mostly below a temperature limit, and the second condition is mostly above such limit, and the transition of the emission buffer from the first to the second condition is caused by a change in the temperature and preferably by the temperature of the exhaust gas flowing through the emission buffer. Since the condition of the storage material gradually changes with the increasing temperature, the absorption capacity decreasing, while simultaneously desorption increases it is not possible to draw a sharp boundary between the two conditions, for which reason the boundary is assumed to lie where the one condition prevails over the other one.

When starting from cold the engine, the emission buffer and the converter are cold so that engine and the converter are inefficient. The engine then produces high concentrations of hydrocarbons and of carbon monoxide and the converter is not in a position of converting such high concentrations.

In the cold condition the emission buffer is however very effective as regards the separation or adsorption of the undesired fractions of the exhaust gas and as regards storing the same. Thus when starting from cold and during the initial phase of warming up the exhaust gas gives up its noxious components to the emission buffer so that the converter is supplied with exhaust gas having an essentially lower concentration of noxious materials. In step with the progress of heating up the engine the concentrations of noxious materials from the same become less and simultaneously the exhaust gas becomes hotter. Then as a result the emission buffer and furthermore the converter downstream from it are heated up. The increasing temperature has the effect that the previously stored noxious substances are released back into the exhaust gas flow by desorption. Because the exhaust gas is now hot, just like the converter connected downstream from it, the conversion rate will increase so that in the noxious substances which have been temporarily held in the emission buffer will reach the catalytic converter in an effective condition thereof and will be converted.

In the case of the use of a liquid storage material a further expedient embodiment of the invention is such that the exhaust gas is fed into same with a swirling or eddying action and upstream from the outlet is subjected to a cyclone-like separating action to remove mist from it before leaving the emission buffer.

In keeping with yet another possible form of the invention above a given threshold for the temperature of the exhaust gas the latter is passed directly into the converter bypassing the emission buffer, it furthermore being possible according to a very advantageous design in accordance with the invention for a first threshold of the exhaust gas temperature to correspond to the temperature limit between the first and the second condition of the emission buffer. In this respect below this first temperature threshold the exhaust gas is preferably passed via the heat storing flow path, designed in the form of the emission buffer, of a heat exchanger and above this first temperature limit via the heat releasing flow path thereof so that the limitation of the contact between the exhaust gas the emission buffer to the period of time in which the temperature of the exhaust gas is below the temperature limit reduces soiling and aging of the emission buffer, while simultaneously desorption is favored by the thermal transition from the exhaust gas at a temperature above the temperature limit to the emission buffer.

In order, in the interests of reducing the emission of noxious substances, to make certain that emissions released by desorption from the emission buffer are effectively converted by the converter, there is a further highly effective development of the invention such that above this temperature limit the exhaust gas is only caused to flow through the emission buffer if the rate of conversion of the converter is sufficiently high.

In accordance with a further possible development of the invention below the first temperature limit the exhaust gas is conducted via the heat absorbing flow path, which is designed in the form of an emission buffer, of a heat exchanger and above this first temperature limit, and if the conversion rate of the converter is not sufficient, the exhaust gas is caused to flow pas the heat exchanger directly to the converter, whereas above this first temperature limit, and provided the conversion rate of the converter is sufficient, it is passed via the heat releasing flow path of the heat exchanger so that until a sufficient conversion rate has been reached the converter is further heated up by the exhaust gas without the content of emissions therein, which will have substantially decreased at the temperatures reached, being increased again by the emissions released by the emission buffer.

Since under full load conditions the exhaust gas from the engine may attain temperatures, which are harmful for the emission buffer, in accordance with a further convenient development of the invention a safety limit is set, with a sufficient clearance below the maximum temperature of the exhaust gas, for the temperature of the exhaust gas to which the emission buffer may be exposed.

In this respect after the temperature threshold has been exceeded it is possible for the emission buffer to remain connected with the exhaust gas duct between the engine intake and the converter for releasing the stored emissions.

Owing to the possibility of bypassing it is possible for the emission buffer to be set for lower mass flows because this setting only takes effect in the cold start phase, when owing to the temperature not being sufficient the converter has not begun functioning and because during operation of the IC engine with a high power and/or a high speeds of rotation the low flow cross section of the emission buffer does not have disadvantageous effects on the exhaust gas flow in the form of a high resistance to pressure, because the converter is now directly acted upon by the exhaust gas. Owing to the design for low mass flows the emission buffer is smaller and furthermore more effective.

Since it is only for a fraction of the operating time that flow through the emission buffer takes place, it is possible for it to be designed with a substantially smaller size having regard to the desired working life than would be case if were to be acted upon by the exhaust gas all the time.

If when starting from cold the storage material in the emission buffer reaches the temperature limit between predominant absorption and predominant desorption more quickly than the converter reaches the temperature necessary for a sufficient degree of conversion, it is an advantage to delay the rise in temperature of the storage material as far as the temperature limit by a cooling effect on the storage material, because in this manner it is possible to abstract noxious emissions from the exhaust gas for a longer time, before such gas flows through the converter which is not yet fully operational.

It is conventional for gasoline and diesel engines to be started with an excess of fuel. During the starting phase there is therefore a risk of the catalytic oxidation of CO and of the unburned hydrocarbons not taking place or not taking place sufficiently, because the air fraction is not sufficient, a contributing factor in this respect being the additional release of emissions to the flow of exhaust gas during the desorption phase of the emission buffer. Therefore in accordance with an advantageous form of the invention prior to their entry into the converter the exhaust gas has secondary air supplied to it in a conventional manner.

An apparatus with an IC engine and with a converter connected in its exhaust gas duct for performing the method in accordance with the invention has the feature that an emission buffer is connected with the input of the converter and is adapted in a first condition to store noxious emissions and in a second phase to release them again and in this respect the exhaust gas duct is preferably provided with a bypass for the emission buffer and the emission buffer or the bypass may be selectively switched into the exhaust gas path between the engine and the converter.

In accordance with a further possible development the emission buffer is constituted by a heat absorbing flow path of a heat exchanger and the connection between the IC engine and the converter may be selectively via this heat absorbing flow path or via the heat releasing flow path of the heat exchanger, and preferably, when the heat absorbing flow path of the heat exchanger is shut off the exhaust gas is able to be conducted selectively via the heat releasing flow path of the heat exchanger or past the heat exchanger to the converter.

A further possible feature of the invention is such that between the IC engine and the emission buffer there is a temperature sensor adapted to respond to the exhaust gas flow and between the IC engine and the converter the exhaust gas path is dependent on the measured exhaust gas temperature.

Preferably the emission buffer comprises a storage material which is suitable for storing and releasing the engine emissions, more particularly unburned hydrocarbons.

In keeping with yet another possible form of the invention the storage material is a sorption material, which is capable of absorbing hydrocarbon at low temperatures and may for instance be in the form of active charcoal, a metallic hydride or a zeolite.

It is also possible to utilize a liquid storage material and more particularly an oil. In this respect it is possible for the emission buffer to be a porous material which is permeable for the exhaust gas and is able to be wetted by the liquid storage material.

In a preferred embodiment of the invention the emission buffer has an exhaust gas inlet in the form of a swirl inducing device and a mist collector upstream from its exhaust gas outlet in the form of a cyclone device.

In accordance with a further possible development the converter is a catalytic converter.

As part of another convenient embodiment of the invention upstream from the converter the exhaust gas duct is provided with a connection, which is able to be switched on and off, for secondary air preferably upstream from the emission buffer so that any desired cooling of the emission buffer is effected as long as combustion of the hydrocarbons and of the carbon monoxide is unable to proceed because the temperature level is not sufficiently high.

Taking into account the conventional manner of operation of motor vehicles and the high emission rate during starting up from cold it is convenient to design the emission buffer for high efficiency at low speeds of rotation and low loads of the engine.

A further possible feature of the invention is such that in the bypass a choke is arranged which is able to be steplessly switched between a open and a closed position as may be desired and as part of a further advantageous feature the section running through the emission buffer of the exhaust gas duct is able to be shut down.

This shutting off device, which leads to expense, may be dispensed with if in accordance with a further preferred embodiment of the invention the exhaust gas duct comprises a choke valve member able to be pivoted about an axis extending through the exhaust gas duct and two branch ducts are connected with the exhaust gas duct in a cross sectional plane containing this axis positioned diametrally opposite in relation to it, such branch ducts being connected with the inlet and, respectively, the outlet of the emission buffer and if in the shut setting the choke valve member extends obliquely in relation to direction of flow of the exhaust gas duct so that the two branch ducts are separated from each other.

In accordance with a further possible development in this arrangement there is no pressure difference between the connections of the two branch ducts so that when the choke valve member is open there is no flow via the emission buffer. If the choke valve member is in its shut position the separation of the two branch duct connections will mean that the exhaust gas flow is conducted via the emission buffer.

A further possible feature of the invention is such that between the emission buffer and the fuel supply point of the engine there is a heat exchanger connection, which is preferably able to be turned on and off.

In accordance with a particularly preferred form of the invention with a heat exchanger it is possible for the exhaust gas to be selectively conducted at least via one heat absorbing or heat releasing flow path and in the heat exchanger the heat releasing flow path for the exhaust gas is able to be shut off and to be included in the heat exchanger selectively. The exhaust gas passes through this flow path when the absorption phase is terminated and the converter has attained a sufficient conversion rate so that for promoting desorption the exhaust gas gives off heat to the flow path which was previously used by the exhaust gas and functions as an emission buffer. It is best for the flow path to carry the combustion air during the absorption phase in order to transfer heat from the emission buffer to the combustion air and hence to prolong the absorption phase, that is to say this flow path for conducting the combustion air is then the heat absorbing flow path of the heat exchanger. Owing to the heating of the combustion air the heating up of the engine is simultaneously accelerated, something that reduces the emissions from the engine and improves mileage.

A further convenient embodiment of the invention is such that between the emission buffer and a coolant circuit there is a heat exchanger connection which is able to be switched on and off and preferably one heat exchanger, which has one flow path for the exhaust gas and one flow path included in the coolant circuit, is placed at a lower level than a compensating container arranged in the coolant circuit, downstream from the compensating and upstream from the heat exchanger there is a shut off valve and between the heat exchanger and the compensating container a pump and a check valve are arranged.

The invention will now be described in more detail with reference to the accompanying drawings, which show several working embodiments thereof.

LIST OF THE SEVERAL VIEWS OF THE FIGURES

FIG. 1 diagrammatically shows the exhaust gas system for an IC engine with an emission buffer.

DETAILED ACCOUNT OF WORKING EMBODIMENTS OF THE INVENTION

Figure 1:
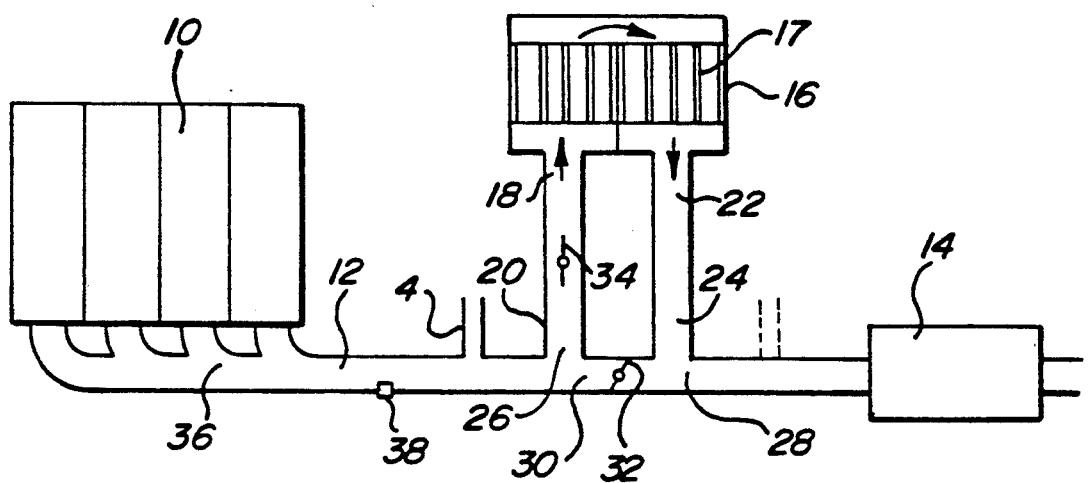

In the case of the embodiment of the invention in accordance with FIG. 1 the exhaust gas produced in the IC engine 10 is led off through an exhaust gas duct 12, which extends to a continuously connected converter 14. Between the engine 10 and the converter 14 there is an emission buffer connected in parallel to an exhaust gas duct 12, the surfaces 17 of the emission buffer in contact with the exhaust gas being at least partly coated with sorption material. The inlet 18 of the emission buffer 16 is connected via a branch duct 20 with the exhaust gas duct 12 and its outlet 22 is connected via a branch duct 24 with it, and between the opening 26 of the branch duct 20 and the opening 28 of the branch duct 24 there is a section 30, bypassing the emission buffer 16, of the exhaust gas duct 12.

The emission buffer 16 is designed for high efficiency at low temperatures.

In order to be able to pass the exhaust gas selectively through the emission buffer 16, in the section 30 there is a choke valve member 32 which may be steplessly moved between an opening position and a shut position illustrated in the FIGURE. In order to ensure that when the choke valve member is completely open the difference in pressure does not cause a flow of the exhaust gas between the branch 26 and the opening 28 through the emission buffer 16, the branch duct, which runs via the emission buffer 16, contains a shut off device, for instance in the branch duct 20, such as one in the form of a choke valve member 34.

If for example by means of a sensor 38 arranged at the outlet of the exhaust gas manifold 36 an operational condition is detected, in which the temperature of the exhaust gas is substantially higher than the desorption temperature of the emission buffer 16, it is possible for the choke member 34 to be closed and the choke member 32 opened, a gradual change being possible because of the stepless adjustability of the choke members 32 and 34. Preferably however the flow path via the emission buffer 16 only shuts with such a sufficient delay that the exhaust gas which will now be at the operational temperature will have caused the desorption of the previously stored emissions.

At exhaust gas temperatures above a given threshold the emission buffer 16 is not to be acted upon by the exhaust gas in order to prevent overheating and damage. Furthermore the emission buffer 16 is not to be exposed to exhaust gas when the engine load is high, because its back pressure would then have disadvantageous effects.

Therefore the control of the flow of exhaust gas through the emission buffer 16 may be furthermore so arranged that this flow is only interrupted when the exhaust gas temperature and/or the engine load exceed a given threshold. In this respect this control condition may be such that it is provided in addition to means for preventing overheating or it may be the sole control condition in order to limit the flow of exhaust gas through the emission buffer to a minimum value, this being an advantage as regards preventing aging and fouling of the emission buffer.

For the supply of secondary air upstream from the converter 14 it is possible to provide a connection 40 between the emission buffer 16 and the converter 14 or to provide a connection 41 upstream from the emission buffer 16.

The start of the supply of secondary air upstream from the converter 14 through the connections 40 and, respectively, 41 may be delayed in relation to the start of the engine, preferably as far as a value in the vicinity of the desorption temperature of the emission buffer. Then the converter 14 will warm up more quickly. The cooling effect of the secondary air on the exhaust gas will initially be absent and the heat released by the absorption of the emissions will lead to an additional heating up of the exhaust gas. At the latest at the start it is necessary to supply secondary air so that there is sufficient oxygen for combustion of the emissions at least in the converter.

In order to ensure an optimum action of the emission buffer the absorption of the emissions in the emission buffer should as far as possible last somewhat longer than the time needed for the converter to reach its minimum activation temperature. The supply of secondary air upstream from the emission buffer to ensure combustion in the converter may keep the temperature in the emission buffer within the range in which absorption is still possible, combustion has already started in the converter, more particularly since the effect of the catalytic converter is due to the lowering of the temperature, at which the combustion of the noxious emissions present in the exhaust gas takes place.

It is therefore to be recommended to supply the secondary air upstream from the emission buffer and to so time the beginning of the supply of the secondary air in accordance with the system that the converter reaches its activation temperature as rapidly as possible and the sufficient combustion air is available and the absorption capacity in the emission buffer is maintained when the converter reaches its activation temperature.

There is a further possibility for timing the desorption in the emission buffer later than the time at which the converter reaches its activation condition, in accordance with which as soon as the temperature of the exhaust gas is such that it would lead to a desorption in the emission buffer the exhaust gas is caused to bypass the emission buffer until the converter reaches its activation temperature.

Figure 2:
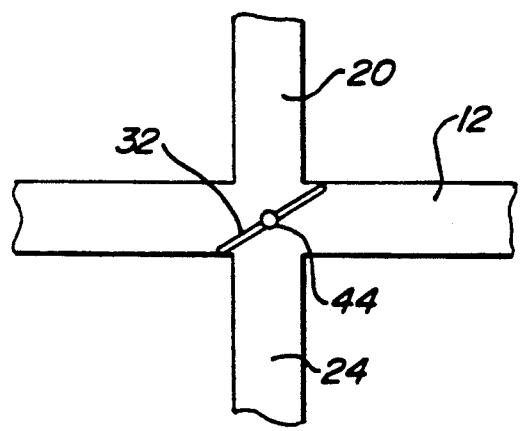
FIG. 2 shows a modified form of the connection of the emission buffer with the exhaust gas duct.

FIG. 2 shows a possible modification of the connection of the emission buffer 16 with the exhaust gas duct 12 in accordance with FIG. 1 so that the choke member 34 may be dispensed with. The branch 26 and the opening 28 are in this case so opposite to each other in the cross section plane, containing the axis 44 of the choke member 32, of the exhaust gas duct 12 that a line connecting them would intersect this axis 44 perpendicularly. In the shut position the choke member 32 extends obliquely to the direction of flow of the exhaust gas duct 12 and is for example at 45° thereto.

In the closed position illustrated in FIG. 2 the choke member 32 separates the branch 26 and the opening 28 from each other so that the exhaust gas is completely passed through the emission buffer 16. If the choke member 32 is opened, there will be no pressure difference between the branch 26 and the opening 28 so that there will be no flow via the emission buffer 16, unless such flow is caused by the choke action when the choke member 32 is not completely opened.

Figure 3:
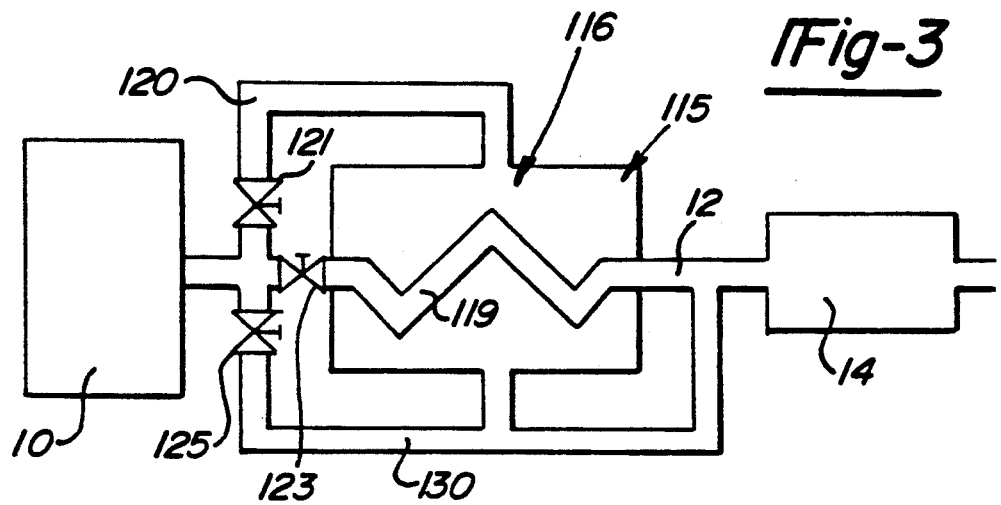
FIG. 3 shows one possible modification of the exhaust gas system illustrated in FIG. 1 and of the emission buffer.

A particularly convenient form of an exhaust gas system is illustrated in FIG. 3, in which between the IC engine 10 and the converter 14 there is a heat exchanger 115, which may be shunted by a bypass section 130 of the exhaust gas duct 12.

Upstream from the heat exchanger 115 the exhaust gas duct 12 is split up into three branches, that is to say the previously noted bypass section 130, a flow path 120 adapted to absorb heat and passing via the heat exchanger 115 and which opens into the bypass section 130 downstream from the heat exchanger 115, and a flow path 119, which also passes through the heat exchanger 115, releases heat and also opens into the bypass section 130. The respectively selected flow path for the exhaust gas is for example set by shut off valves 121, 123 and 125, which may also be replaced by two three-way valves.

At the heat exchanger 115 the surfaces, which define the heat absorbing flow path 120, are partly or completely coated with sorption material, such coating being preferably on the outer surfaces of the heat releasing branch 119 so that this flow path 120 constitutes the emission buffer 116 in the coated part.

When starting up from cold the valves 123 and 125 are shut, whereas the valve 121 is open so that the cold exhaust gas, which is now gradually being warmed up, flows from the exhaust gas duct 12 into the flow path 120 and in the emission buffer the entrained emissions are released to the sorption material. If the absorption limit of the emission buffer is reached before the converter 14 has reached a sufficient rate of conversion, the valve 121 is shut and the valve 125 is opened so that the exhaust gas, which is now hot, flows past the heat exchanger 115 via the bypass section 130 to the converter 14, which is heated up further, while the further heating of the branch 120 and consequently of the emission buffer 116 is interrupted so that the exhaust gas flowing to the converter 14 does still not contain any emission fractions released owing to desorption from the emission buffer 116.

When the converter 14 has reached a sufficient conversion rate, the valve 125 is shut and the valve 123 is opened so that the exhaust gas now flows via the heat releasing flow path 119 through the heat storage means 115 and the heat absorbing flow path 120 and consequently the emission buffer 116 is heated up further and desorption commences, the released emissions passing via the branch duct 120 and the bypass section 130 to the converter 14.

In the event of the temperature of the exhaust gas exceeding a preset safety temperature threshold, the valve 123 will be shut and the valve 125 opens so that overheating of the heat storage material is avoided, because the exhaust gas will now again flow via the bypass section 130 to the converter 14.

Figure 4:
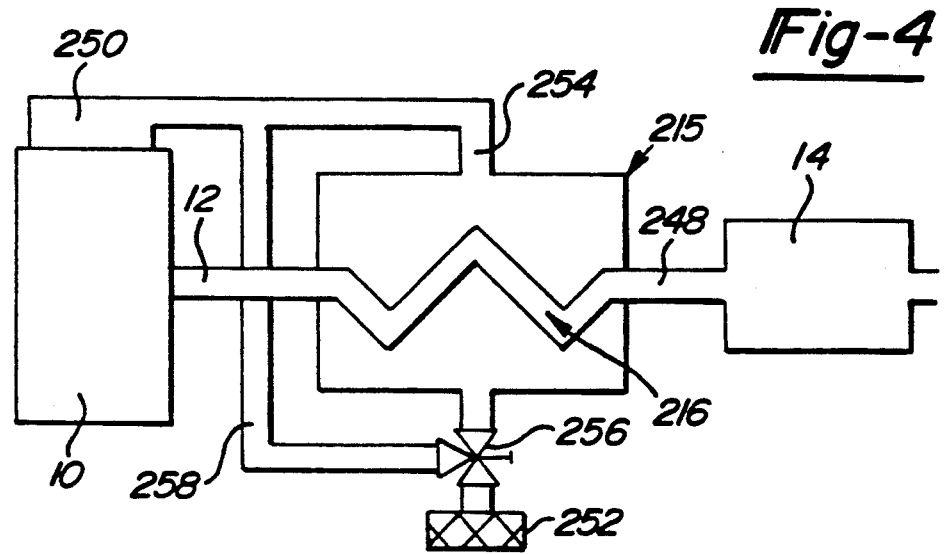
FIG. 4 shows a further possible embodiment of the exhaust gas system with a means for cooling the emission buffer and for the heating the combustion air.

FIG. 4 shows a simple arrangement, in which in order to cool the storage material the combustion air taken in by the engine is employed, which is then conveniently preheated. In the illustrated working embodiment a heat exchanger 215 is arranged between the engine 10 and the converter 14 so that the flow path 248 of the heat exchanger releasing heat continuously has exhaust gas flowing through it on its way from the engine 10 to the converter 14; at the inner wall surface it is coated with storing material so that this part constitutes the emission buffer 216.

The air manifold 250 of the engine 10 is connected with an air filter 252 for the induction of air via the heat absorbing flow path 254 of the heat exchanger 215 so that the cold intake combustion air takes up heat on passing through the heat exchanger 215 from the storage material and hence increases in temperature. Between the air filter 252 and the heat exchanger 215 there is a three-way valve 256, which is adapted to shut off the heat absorbing flow path 254 and to cause the combustion air to flow via a bypass 258, shunting the heat exchanger 215, to the air manifold 250.

When the engine 10 has reached its operational temperature and the converter 14 has reached a temperature at which there is a sufficient conversion rate, the combustion air is caused to flow via the bypass 258 so that the temperature of the storage material exceeds the temperature threshold and comes into that part in which desorption predominates so that the stored emissions are released from the emission buffer and supplied to the converter.

In the event of cooling of the storage material combined with a heating of the combustion air being desired while but with a possibility of causing the exhaust gas to bypass the emission buffer in order to reduce contamination and aging of the buffer, when the exhaust gas temperature has exceeded the said temperature threshold, it is possible to utilize the arrangement illustrated in FIG. 5, which will accordingly now be described.

Figure 5:
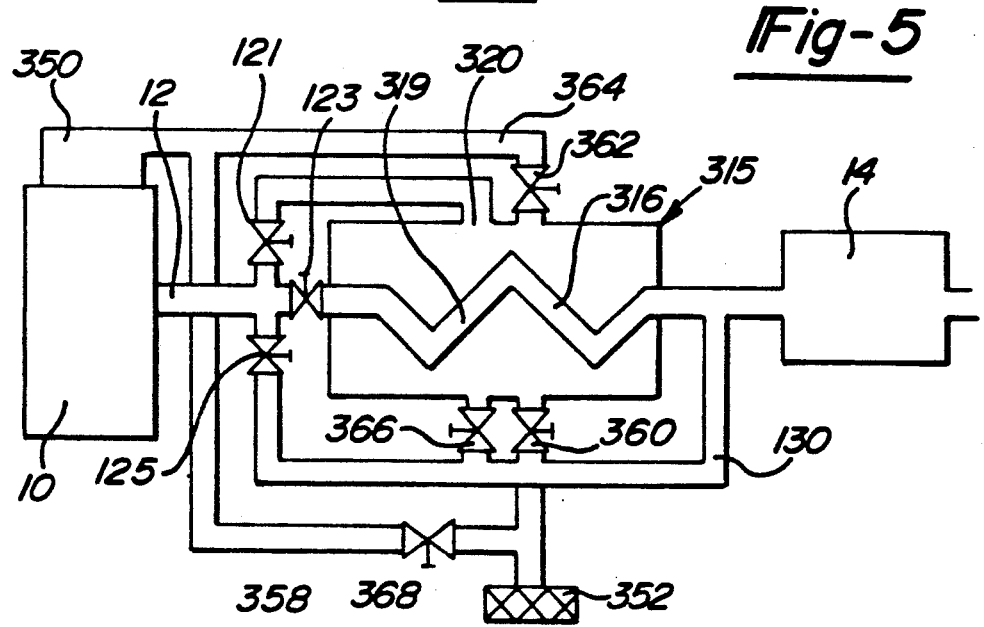
FIG. 5 shows a modified form of the exhaust gas system in accordance with FIG. 4.

The arrangement in accordance with FIG. 5 is different to that illustrated in FIG. 3 since the flow paths 319 and 320 through the heat exchanger, here referenced 315, are changed over to have the reverse of the functions illustrated in FIG. 3 since in the arrangement in accordance with FIG. 5 the storage material is arranged on the inner wall surface of the flow path 319 so that the emission buffer 316 is constituted by the coated part of the flow path 319. Furthermore when the flow path 320 is not conducting the exhaust gas because the valve 121 is closed, the path 320 may, by the operation of valves 360, 362, 366 and 368, be included in an air induction duct 364, which, when the valves 360 and 362 are open and the valves 366 and 368 are shut, connects an air filter 352 with the air manifold 350 of the engine 10. Then at least when the valve 121 is opened and when the flow path 320 is connected with the exhaust gas duct 12 and is not available for the supply of combustion air to the engine 10, a bypass 358 enables the combustion air to shunt the heat exchanger 315, such bypass conducting the combustion air after the closing of the valves 360 and 362 and the opening of the valve 368, the said ganging of the valves meaning that the valve 366 is open as well so that the exhaust gas flowing via the valve 121 into the flow path 320 is able to leave via the bypass 130 and reach the converter 14.

During starting from cold the valve 121 and 125 are shut while the valve 123 is open so that the cold, slowly warmed up exhaust gas flows from the exhaust gas duct 12 into the flow path 319 and consequently into the emission buffer 316 and is able to give up its entrained emissions to the sorption material. Furthermore simultaneously the valves 360 and 362 are opened for flow into the flow path 320, whereas the valves 366 and 368 are shut. The combustion air flowing along the flow path 320 hence takes up heat from the storage material of the emission buffer 316 and is heated up as a result, while the absorption phase of the emission buffer is extended.

When the absorption threshold of the emission buffer is reached but without the converter 14 however having reached a sufficient rate of conversion, the valves 360, 362, 366 and 368 are switched over in order to cause the combustion air to flow via the bypass 358. Furthermore the valve 123 is shut and the valve 125 is opened so that the exhaust gas, which in the meantime has heated up, flows bypassing the heat exchanger 315 via the bypass section 130 to the converter 14, which will be further heated, while the further heating of the branch 319 and consequently of the emission buffer 316 is interrupted so that the exhaust gas flowing to the converter 14 does not yet contain any emission fractions released by desorption from the emission buffer 316.

Once the converter 14 has attained a sufficient conversion rate, the valve 125 is shut and the valve 121 is opened so that the exhaust gas will now flow via the flow path 320 through the heat storage means 315 and consequently the flow path 319 and therefore the emission buffer 316 will be further heated and desorption will start, the released emissions passing via the branch duct 319 to the converter 14.

If the temperature of the exhaust gas should exceed a preset temperature threshold, the valve 121 is closed and the valve 125 is opened so that there can be no overheating of the storage material, because the exhaust gas now flows again via the bypass section 130 to the converter 14.

There is however the possibility of cooling the storage material of the emission buffer by the liquid coolant of the engine 10, it then however being necessary to avoid heating of the coolant liquid past the upper limit of its operational range when the temperature of the exhaust gas increases; more particularly it should not be heated above its boiling point.

Figure 6:
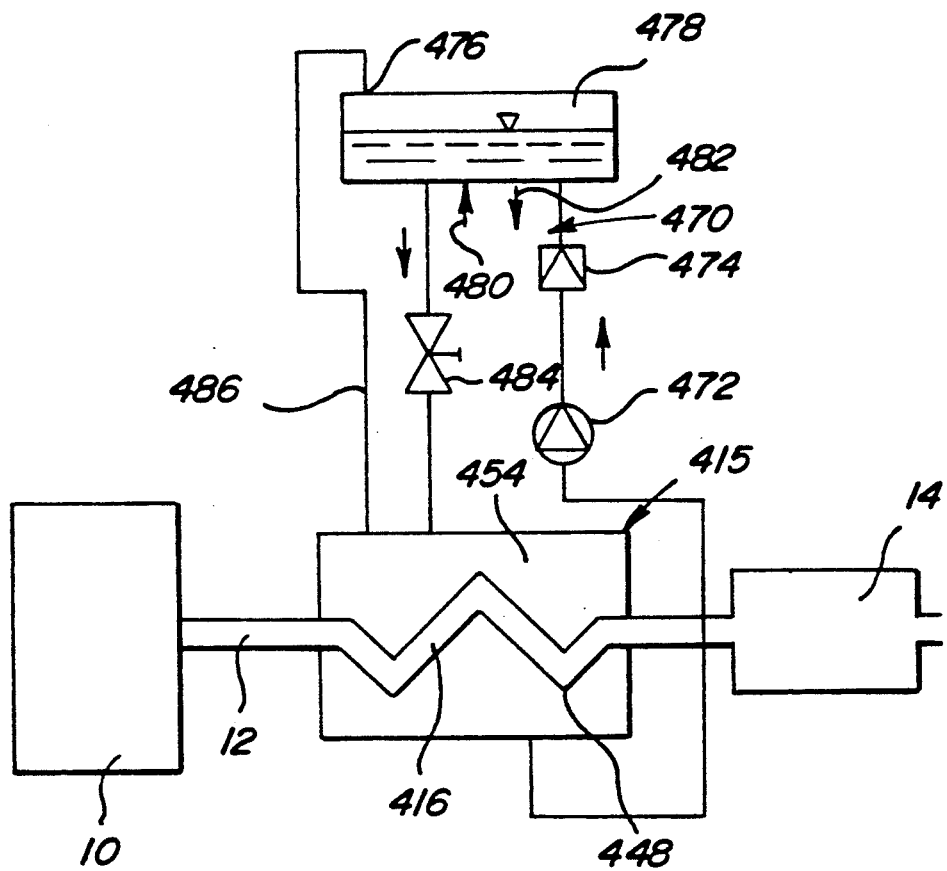
FIG. 6 illustrates the exhaust gas system with a means for cooling the emission buffer by using the engine coolant.

FIG. 6 shows and arrangement for this manner of operation.

The heat exchanger 415 is associated with the exhaust gas system in the same manner as in FIG. 4. The flow path 448 connects the engine 10 with the converter 14 and has the exhaust gas continuously flowing through it. Internally it is coated with the storage material and consequently constitutes the emission buffer 416. The flow path 454 of the heat exchanger is included in a coolant circuit generally referenced 470 as long as the storage material of the emission buffer 416 is to be cooled down. The coolant circuit 470 comprises a pump 472 downstream from which there is a check valve 474, a compensating container 478 arranged at a higher level than the heat exchanger 415 and provided with a venting means 476 and which via a supply duct 480 and a return duct 482 is connected with the coolant circuit, in a manner not described in detail, of the engine 10, and lastly a check valve 484.

When the exhaust gas passing through the heat exchanger 415 has attained the right temperature of the coolant or when the cooling of the storage material is not to be further continued, the check valve 484 is closed. Then the flow path 454 in the heat exchanger 415 is drained by the pump 472, which conveys the coolant into the compensating container 478 arranged at a higher level, it being prevented from returning to the heat exchanger by the check valve 474. After the opening of the check valve 484 the coolant will flow back into the heat exchanger under the effect of gravity.

The heat exchanger 415 and the compensating container 478 are connected with each other by an air equalizing duct 486.

I claim:

1. A method for the treatment of the exhaust gas of internal combustion engines comprising the steps of:
   providing an exhaust gas means for exhausting gas from the engine outlet to a converter, an emission buffer is coupled with the exhaust gases means, a heat exchanger having two distinct flow paths coupled with said exhaust gas means and said emission buffer positioned in one of said flow paths, and valve means for directing exhaust flow through the exhaust means;
   directing substantially all of the exhaust flow, via said valve means, from the engine into the heat exchanger flow path including said emission buffer at start up of the engine;
   storing noxious emissions, temporarily, in the emission buffer during start up of the engine as exhaust flow passes into said emission buffer;
   heating said emission buffer to a desired temperature with the exhaust gas flow passed into said heat exchanger;
   releasing said noxious emissions from said emission buffer, after heating of said emission buffer, and passing said released noxious emissions into said converter;
   directly bypassing said emission buffer with the exhaust gases flow, via said valve means, upon reaching a desired temperature; and
   passing said exhaust gas flow from said engine directly to said converter.

2. The method as claimed in claim 1, wherein the emissions are preferably stored in the emission buffer in a suitable storage material.

3. The method as claimed in claim 2 using a storage material existing in a first condition predominantly below, and in a second condition predominantly above a temperature threshold, the transition of the emission buffer from the first to the second condition being caused by a change in temperature.

4. The method as claimed in claim 3, wherein the transition of the emission buffer from the first to the second condition is caused by the temperature of the exhaust gas flowing through the emission buffer.

5. The method as claimed in claim 1, wherein above a given threshold for the exhaust gas temperature the exhaust gas is passed directly to the converter, the emission buffer being bypassed.

6. The method as claimed in claim 5, wherein a first threshold for the exhaust gas temperature is equal to the temperature limit between the first and the second condition of the emission buffer.

7. The method as claimed in claim 6, wherein the exhaust gas is passed below this first threshold via the heat absorbing flow path, adapted to function as an emission buffer, of a heat exchanger and above such temperature threshold is passed through a heat releasing flow path thereof.

8. The method as claimed in claim 5, wherein above said threshold temperature the exhaust gas flows through the emission buffer when the conversion rate of the converter is sufficiently high.

9. The method as claimed in claim 8, wherein below the first temperature threshold the exhaust gas is caused to flow along the heat absorbing flow path, designed in the form of an emission buffer, of a heat exchanger above this first temperature and when the conversion rate of the converter is not sufficient it is caused to flow past the heat exchanger directly to the converter, while on the other hand above this first temperature threshold and when the conversion rate is sufficient it is caused to flow via the heat releasing flow path of the heat exchanger.

10. The method as claimed in claim 6, wherein providing a safety temperature threshold to which the emission buffer may be subjected, which is a temperature sufficiently lower than the maximum exhaust gas temperature.

11. The method as claimed in claim 9, wherein when a safety temperature threshold has been exceeded the emission buffer is kept connected with the exhaust gas duct between the engine outlet and the converter in order to release the stored emissions.

12. The method as claimed in claim 1, wherein secondary air is supplied to the exhaust gas prior to entry thereof into the converter.

13. An apparatus for treatment of exhaust gas comprising an internal combustion engine and a converter placed in an exhaust gas duct which connects said engine with said converter;
   a heat exchanger having two distinct flow paths including an emission buffer positioned in one of said flow paths coupled with said exhaust gas duct, said emission buffer including means for temporarily storing noxious emissions from said engine at start up of said engine and said means releasing said stored noxious emissions back into said exhaust gas duct after said emission buffer has reached a desired temperature; and valve means for directing exhaust gas flow through said exhaust gas duct such that substantially all of the exhaust flow is passed through said heat exchanger flow path including said emission buffer at start up and upon reaching a desired temperature, said valve means directs said exhaust gas flow directly to said converter bypassing said emission buffer.

14. The apparatus as claimed in claim 13, wherein the emission buffer is constituted by the heat absorbing flow path of a heat exchanger and wherein the connection between the IC engine and the converter may be arranged selectively via its heat absorbing flow path or the heat releasing flow path of the heat exchanger.

15. The apparatus as claimed in claim 14, wherein when the heat absorbing flow path of the heat exchanger is shut off the exhaust gas may be selectively fed via the heat releasing flow path of the heat exchanger or shunted past the heat exchanger to the converter.

16. The apparatus as claimed in claim 15, wherein between the engine and the emission buffer a temperature sensor is arranged adapted to respond to the temperature of the exhaust gas flow and the exhaust gas path between the engine and the converter is dependent on the exhaust gas temperature which is detected.

17. The apparatus as claimed in claim 13, wherein the storage means is adapted to more particularly store unburned hydrocarbons.

18. The apparatus as claimed in claim 17, wherein the storage means is a sorption-type material, which is adapted to absorb hydrocarbons at a low temperature and to release them at a high temperature.

19. The apparatus as claimed in claim 18, wherein the sorption-type material includes active charcoal.

20. The apparatus as claimed in claim 18, wherein the sorption-type material includes a metallic hydride.

21. The apparatus as claimed in claim 18, wherein the sorption-type material includes a zeolite.

22. The apparatus as claimed in claim 13, wherein the converter is a catalytic converter.

23. The apparatus as claimed in claim 13, wherein upstream from the converter the exhaust gas duct is provided with a connection for secondary air which is able to be turned on and off.

24. The apparatus claimed in claim 23, wherein the connection for secondary air is arranged upstream from the emission buffer.

25. The apparatus as claimed in claim 15, wherein said valve means includes a choke valve member arranged in a bypass and such valve member may be moved between an opened and a closed setting as desired.

26. The apparatus as claimed in claim 25, wherein a section running via the emission buffer of the exhaust gas duct is provided with means for shutting it off.

27. The apparatus as claimed in claim 22, wherein the emission buffer is designed for a high efficiency at low speeds of rotation and low loads of the engine.

28. The apparatus as claimed in claim 15, wherein the emission buffer is constituted by the heat absorbing flow path positioned within a heat exchanger and wherein the connection between the engine and the converter may be arranged selectively via said heat absorbing flow path or a heat releasing flow path of the heat exchanger, and in the heat exchanger the heat releasing flow path for the exhaust gas is provided with means for selectively including it in a combustion air supply means.

* * * * *